United States Patent
Weiss

(10) Patent No.: US 7,923,871 B2
(45) Date of Patent: Apr. 12, 2011

(54) ELECTRICAL MACHINE

(75) Inventor: Sebastian Weiss, Zirndorf (DE)

(73) Assignee: Siemens Aktiengesellschaft, München (DE)

( * ) Notice: Subject to any disclaimer, the term of this patent is extended or adjusted under 35 U.S.C. 154(b) by 262 days.

(21) Appl. No.: 12/295,484

(22) PCT Filed: Jan. 29, 2007

(86) PCT No.: PCT/EP2007/050845
§ 371 (c)(1),
(2), (4) Date: Sep. 30, 2008

(87) PCT Pub. No.: WO2007/113024
PCT Pub. Date: Oct. 11, 2007

(65) Prior Publication Data
US 2009/0273246 A1    Nov. 5, 2009

(30) Foreign Application Priority Data
Mar. 31, 2006   (DE) .......................... 10 2006 015 064

(51) Int. Cl.
*H02K 9/00* (2006.01)
*H02K 1/32* (2006.01)

(52) U.S. Cl. .............. 310/62; 310/58; 310/60 R; 310/61

(58) Field of Classification Search ............... 310/57, 310/58, 59, 60 A, 60 R, 61, 62, 63
See application file for complete search history.

(56) References Cited

U.S. PATENT DOCUMENTS

| | | | | |
|---|---|---|---|---|
| 2,043,655 | A | * | 6/1936 | Ehrmann ........................ 310/57 |
| 6,891,291 | B1 | * | 5/2005 | Weihsmann ..................... 310/62 |
| 2004/0108775 | A1 | * | 6/2004 | Bilsing ............................ 310/58 |
| 2005/0067917 | A1 | * | 3/2005 | Kastinger et al. ............. 310/257 |
| 2005/0116556 | A1 | * | 6/2005 | Huang et al. ................... 310/58 |

FOREIGN PATENT DOCUMENTS

| | | |
|---|---|---|
| DE | 470 020 C | 1/1929 |
| DE | 616 902 C | 8/1935 |
| DE | 42 42 132 A1 | 6/1994 |
| DE | 199 08 246 A1 | 8/2000 |
| RU | 4639 U1 | 7/1997 |
| SU | 780101 A1 | 11/1980 |
| SU | 1356124 A1 | 11/1987 |

* cited by examiner

*Primary Examiner* — Quyen Leung
*Assistant Examiner* — Leda Pham
(74) *Attorney, Agent, or Firm* — Henry M. Feiereisen; Ursula B. Day

(57) ABSTRACT

The invention relates to an electrical machine (1) having a stator (4) and a rotor (3), with the rotor (3) having a plurality of axially arranged cooling channels (8) and a first (5a) and a second (5b) end face, and a fan unit (6) being arranged adjacent to each end face and comprising at least two 10 fan segments (7), with one fan segment (7) in each case being associated with one cooling channel (8) and being arranged alternately adjacent to the first (5a) and the second (5b) end face, and with the fan segment (7) having at least one air guide channel (7a) and at least one air guide wall (7b).

8 Claims, 2 Drawing Sheets

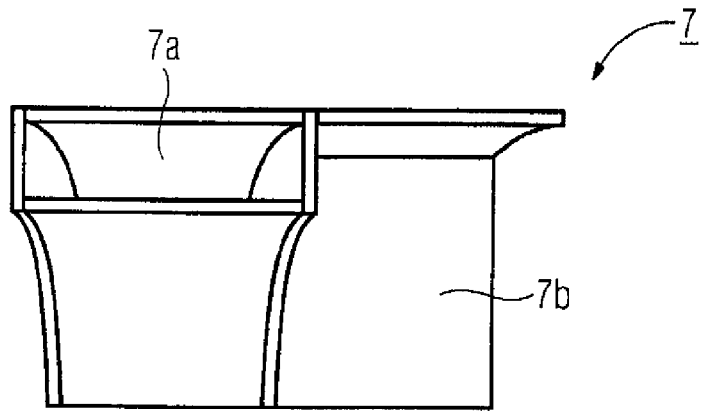
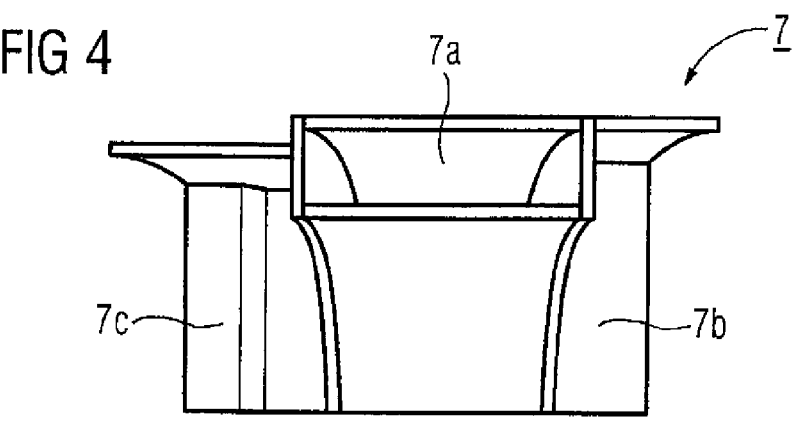
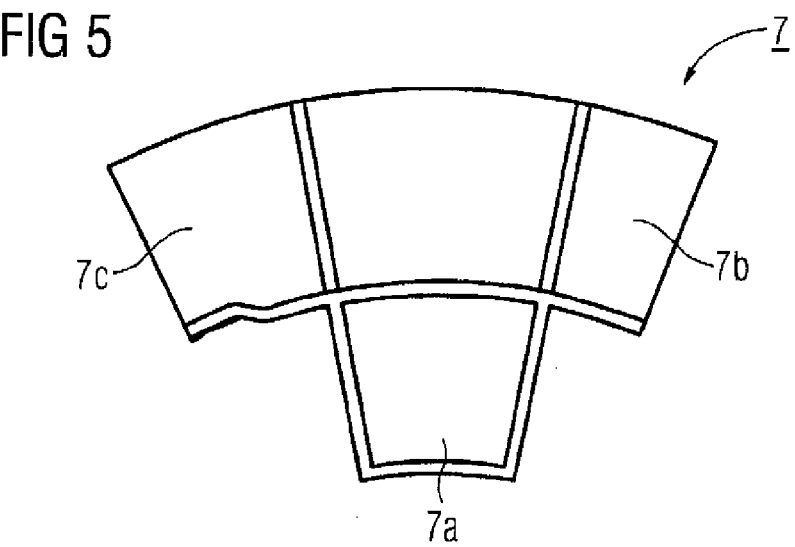

ELECTRICAL MACHINE

BACKGROUND OF THE INVENTION

The invention relates to an electrical machine having a stator and a rotor, with the rotor having a plurality of axially arranged cooling channels and a first and a second end face, and with a fan unit being arranged on each end face and comprising at least two fan segments, with one fan segment in each case being associated with one cooling channel and being arranged alternately on the first end face and on the second end face.

Heat losses occur during operation of electrical machines, and must be appropriately dissipated. It is known for electrical machines, in particular of a closed type, to be equipped with internal cooling circuits which ensure appropriate cooling by equalizing out the temperature differences in the interior of the machine.

DE 42 42 132 A1 discloses a closed electrical machine in which an internal fan is arranged on the rotor shaft on each of the two end faces of its rotor and rotor cooling channels, which extend over the entire axial length of the rotor laminated core, are provided in the rotor laminated core. Flow passes through the rotor cooling channels either from the drive end to the non-drive end or vice versa, that is to say the flow takes place in opposite directions. The internal fans are in the form of integral radial fans, and are arranged directly on the rotor shaft.

DE 616 902 discloses a cooling arrangement for rotors for completely closed electrical machines, in which the rotor is cooled by circulating air flows which are passed alternately through axial channels in a different direction and are moved by fans on the end faces of the rotor, with fans being arranged on both end faces of the machine and being provided in their hub part with channels which are used to guide the air flows.

One disadvantage in this case is that the fans can be used only for electrical machines of one specific size, since they are formed integrally. Other fans must accordingly be used for electrical machines of other sizes.

DE 470 020 discloses a cooling arrangement for rotors of a completely closed type, in which the cooling air is sucked by vanes, which are fitted to the end surfaces of the rotor, through axial channels in the rotor from the drive end to the non-drive end, and vice versa.

SUMMARY OF THE INVENTION

The invention is based on the object of developing an electrical machine of this generic type such that the fans can be used for internal cooling of electrical machines of different sizes.

The electrical machine according to the invention has a stator and a rotor with a plurality of axially arranged cooling channels. A fan unit is arranged on each of the two end faces of the rotor and comprises at least two fan segments, with one fan segment in each case being associated with one cooling channel. In this case, the fan segments are arranged alternately on the two end faces, so that the fan segments of in each case one end face are associated with every alternate cooling channel. The fan segment has an air guide channel and an air guide wall, with the air guide walls extending on two sides of the air guide channel and with the air guide walls of two adjacent fan segments overlapping or being connected to one another, at least in places.

The fan unit comprises at least two fan segments, that is to say a functional fan unit is formed by a plurality of fan segments. One fan segment is in each case associated with one cooling channel and are arranged alternately on the first and on the second end face, so that the fan segments of in each case one end face are arranged on every alternate cooling channel. If the rotor has a total of one to n (1−n) cooling channels, then the fan segments on the first end face are in each case arranged on the odd-numbered cooling channels, and the fan segments on the second end face are arranged corresponding to the even-numbered cooling channels. For example, if the rotor has six cooling channels, then the fan segments on the first end face are arranged on the first, third and fifth cooling channels, and the fan segments on the second end face are arranged on the second, fourth and sixth cooling channels. This results in an offset arrangement of the fan segments on the two end faces. In consequence, the flow passes in a corresponding manner in opposite directions through the cooling channels, either from the drive end to the non-drive end, or vice versa.

The fan segment comprises an air guide channel and two air guide walls. The cooling medium, for example air, is transported in the air guide channel. The cross section of the cooling channel at right angles to the rotor axis therefore corresponds essentially to the cross section of the air guide channel, since the air is sucked in through the cooling channels and is then emitted through the air guide channel of the fan segment. The fan segment may also have a plurality of air guide channels, for example two.

The air guide walls are preferably designed such that that the air guide walls of two adjacent fan segments are connected to one another or overlap one another at least in places. This overlap or connection of the air guide walls which exists at least in places results in the air flow being guided in a defined manner in the electrical machine, as follows: the air is first of all sucked in by the fan unit, for example comprising three fan segments, on the first end face and flows through the associated cooling channels, correspondingly through the first, third and fifth cooling channels if there are a total of six cooling channels. The air then emerges from the air guide channels of the three fan segments, flows via the end winding to the housing wall of the electrical machine, and then back into the second, fourth and sixth cooling channels of the rotor since the air is now sucked in by the fan unit on the second end face.

The air guide walls are advantageously arranged parallel to the first or second end face on the air guide channel. The air guide wall is arranged parallel when the fan unit is, for example, in the form of a radial fan. In this case, the air to be emitted is essentially deflected through 90°. The fan unit may, however, also be in the form of a diagonal fan, in which case the air guide wall would not be arranged parallel to the first or second end face. By way of example, the air guide wall could then be arranged such that the angle between the air guide wall and the first or second end face is essentially 45°. The fitting of the air guide wall results in the air flow being guided in a defined manner within the electrical machine, thus resulting in uniform cooling.

The fan segment preferably has an air guide channel and two air guide walls, with the air guide walls extending on two sides of the air guide channel.

The second air guide wall is preferably arranged closer to the first or second end face of the rotor. The offset arrangement of the air guide walls makes it possible for the air guide walls of adjacent fan segments to overlap. This results in a common, stable air guide wall for the adjacent fan segments, as a result of which the air flow is passed in a defined manner into the corresponding cooling channels of the rotor. For example, the second air guide wall of the first fan segment is thus moved under the first air guide wall of the second fan segment, since the air guide walls are both arranged offset and parallel to the end face of the rotor.

The fan segment is preferably produced from cast aluminum. This allows low-cost production, particularly for large quantities. The fan segment may, however, also be produced from other materials, for example plastic, steel or other metals.

The fan segment is preferably attached by a screw to the end face of the rotor. By way of example, during assembly by means of screw connections, the rotor can be balanced on the screws by washers being fitted. Other types of attachment are, of course, also possible. For example, a fan segment can be attached to the cooling channels of the rotor by means of a snap-action connection. Snap-action connections make use of the elasticity of the materials, for example plastics or spring steel, in order to connect two components. By way of example, hooks are fitted to the fan segment and then hook, preferably detachably, into the cooling channels. In the event of repair, a fan segment can then easily be replaced.

The fan unit is preferably in the form of a radial or diagonal fan. The air is sucked in parallel to or axially with respect to the rotor axis through the cooling channels since the rotation of the rotor results in a reduced pressure being created in the cooling channels. The air is thus sucked into the cooling channels and is passed to the fan unit, that is to say to the fan segments. The air is then appropriately deflected and is emitted radially or diagonally.

The embodiment of the fan unit in the form of individual fan segments makes it possible to use the fan segments for electrical machines of different sizes. This is governed essentially by the size of the air guide walls of the fan segments. A specific diameter range of the rotor and of the air guide channels can be covered by the physically identical fan segments because of the variability in the overlap of the air guide walls. For example, in the case of electrical machines with a relatively small rotor diameter, the overlap of the air guide walls is greater than in the case of machines with a larger rotor diameter.

Furthermore, the use of fan segments instead of integral fans reduces the number of fan variants. In addition, there is no need for any additional mechanical machining of the fan segments. In the case of conventional fans, the hub diameter, the length or the external diameter frequently has to be turned on a lathe.

BRIEF DESCRIPTION OF THE DRAWING

Further features and details of the invention will be explained in more detail in the following description in conjunction with the attached drawings and on the basis of exemplary embodiments. In this case, features and relationships which are described in individual variants can in principle be transferred to all the exemplary embodiments. In the drawings:

FIG. 3 shows a first embodiment of a fan segment;

FIG. 4 shows a second embodiment of a fan segment; and

FIG. 5 shows a plan view of a fan segment as shown in FIG. 4.

DETAILED DESCRIPTION OF PREFERRED EMBODIMENTS

Figure 1:
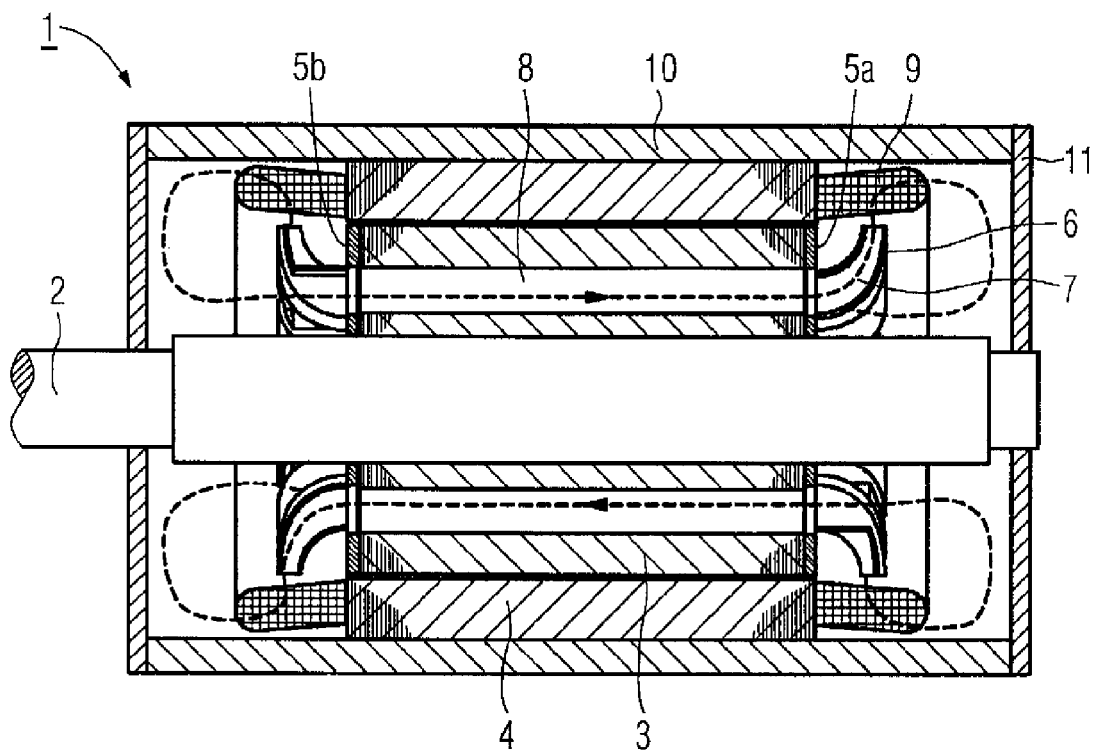
FIG. 1 shows a longitudinal section illustration of an electrical machine according to the invention.

FIG. 1 shows a longitudinal section illustration of an electrical machine 1 according to the invention. The electrical machine 1 has a stator 4 with end windings 9, and has a rotor 3 which is arranged on the rotor shaft 2. The fan unit 6 is arranged on each of the two end faces 5a, 5b of the rotor 3, and comprises a plurality of fan segments 7. Furthermore, the rotor 3 has a plurality of axial cooling channels 8. The fan segments 7 are arranged alternately on the two end faces 5a, 5b. The cooling medium, in particular air, is sucked in by the fan units 6 which are formed on the two end faces 5a, 5b, and flows through the cooling channels 8 and the fan segments 7 via the end windings 9 to the inner wall of the housing 10 and of the bearing shield 11 back into the cooling channels 8. The fan unit 6 comprises a plurality of fan segments 7, thus forming a functional radial fan.

Figure 2:
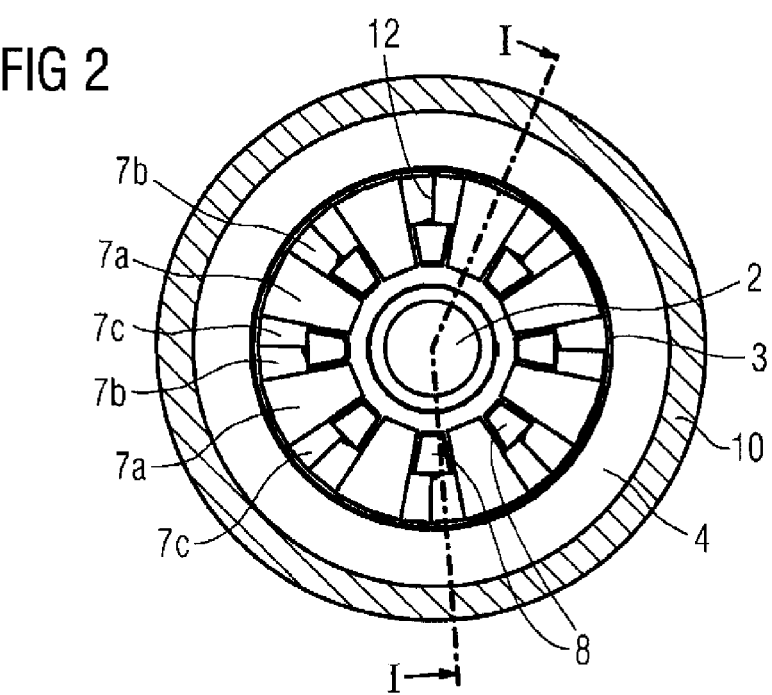
FIG. 2 shows a cross-sectional illustration of an electrical machine according to the invention.

FIG. 2 shows a cross-sectional illustration of an electrical machine 1 according to the invention, looking at the first rotor end face 5a. This clearly shows the cooling channels 8 of the rotor 3, with a total of 16 cooling channels 8 being provided. Each cooling channel 8 has an associated fan segment 7 thus resulting in eight fan segments being arranged on each end face 5a, 5b. Furthermore, the air guide channel 7a and the air guide walls 7b and 7c are illustrated. The air guide walls 7b and 7c are arranged parallel to the end face 5a that is shown. As already described in more detail, the air guide walls 7b and 7c are arranged offset such that the second air guide wall 7c is arranged closer to the end face 5a. This leads to the overlap 12, since the second air guide wall 7c of a fan segment 7 is moved below the first air guide wall 7b of the adjacent fan segment 7. A first air guide wall may, of course, also be moved under the second air guide wall. It is also possible for the air guide walls not to overlap at all, but just to be connected to one another. Furthermore, FIG. 2 shows that the air guide walls 7b and 7c are designed such that the air guide channels 8 which are used to feed back the air remain correspondingly free in order that the air has free access there, sucked in by the fan unit, which is not illustrated, to the opposite end face of the rotor 3.

FIG. 3 shows a first embodiment of a fan segment 7. The fan segment 7 comprises an air guide channel 7a and an air guide wall 7b. The air is transported or sucked in the air guide channel 7a. The air guide wall 7b is arranged on the air guide channel 7a, parallel to one of the two end faces 5a or 5b, although this is not illustrated here. The air guide wall is designed such that it is connected to or overlaps an adjacent fan segment, which is not shown, at least in places.

FIG. 4 shows a second embodiment of a fan segment 7. The fan segment 7 has the air guide channel 7a and two air guide walls 7b and 7c, which extend on opposite sides of the air guide channel 7a. As can be seen particularly well in FIG. 4, the air guide walls 7b and 7c are arranged offset with respect to one another, with the air guide wall 7c being arranged closer to the end face of the rotor which is not illustrated. This allows an overlap during assembly of the fan segments 7.

FIG. 5 shows a plan view of a fan segment 7 as shown in FIG. 4. As can be seen from FIG. 5, the air guide walls 7b and 7c do not extend over the entire air guide channel 7a, but only to such an extent that the cooling channels which are not shown remain free for the air to be fed back.

What is claimed is:

1. An electrical machine, comprising:
   a stator; and
   a rotor interacting with the stator, said rotor having a plurality of axially arranged cooling channels opposite and first and second end faces, said rotor including fan units arranged on the first and second end faces in one-to-one correspondence and comprising at least two fan segments, each of which interacting with a cooling channel and which are arranged alternately on the first end face and on the second end face, wherein each fan segment has at least one air guide channel and two air guide walls, with the air guide walls extending on two sides of the air guide channel, and with the air guide walls of two adjacent fan segments overlapping one another, at least in places.

2. The electrical machine as claimed in claim 1, wherein the air guide walls are arranged in parallel relationship to the first or second end face of the rotor.

3. An electrical machine, comprising:
a stator; and
a rotor interacting with the stator, said rotor having a plurality of axially arranged cooling channels opposite and first and second end faces, said rotor including fan units arranged on the first and second end faces in one-to-one correspondence and comprising at least two fan segments, each of which interacting with a cooling channel and which are arranged alternately on the first end face and on the second end face, wherein each fan segment has at least one air guide channel and two air guide walls, with the air guide walls extending on two sides of the air guide channel, and with the air guide walls of two adjacent fan segments overlapping or being connected to one another, at least in places, wherein one of the air guide walls is arranged closer to the first or second end face than the other one of the air guide walls, wherein one of the air guide walls is arranged closer to the first or second end face than the other one of the air guide walls.

4. The electrical machine as claimed in claim 1, wherein each fan segment is produced from cast aluminum.

5. The electrical machine as claimed in claim 1, wherein the fan segments are attached by a screw to the respective one of the end faces of the rotor.

6. The electrical machine as claimed in claim 1, wherein the fan unit is a radial fan.

7. The electrical machine as claimed in claim 1, wherein the fan unit is a diagonal fan.

8. The electrical machine as claimed in claim 1, wherein one of the air guide walls is arranged closer to the first or second end face than the other one of the air guide walls.

* * * * *

UNITED STATES PATENT AND TRADEMARK OFFICE
CERTIFICATE OF CORRECTION

PATENT NO.        : 7,923,871 B2                                  Page 1 of 1
APPLICATION NO.   : 12/295484
DATED             : April 12, 2011
INVENTOR(S)       : Sebastian Weiss It is certified that error appears in the above-identified patent and that said Letters Patent is hereby corrected as shown below:

Column 4, claim 1, line 62: after "opposite" delete "and";
    after "channels" insert --and--.

Column 6, claim 3: line 5: after "walls" delete "," and insert --.--;
Column 6, claim 3: delete lines 6 – 8.

Signed and Sealed this
Thirty-first Day of May, 2011

David J. Kappos
*Director of the United States Patent and Trademark Office*